US012568348B2

(12) United States Patent
Beal et al.

(10) Patent No.: US 12,568,348 B2
(45) Date of Patent: Mar. 3, 2026

(54) SYSTEMS, DEVICES, AND METHODS FOR COMMUNICATING VEHICLE-RELATED IMAGE DATA

(71) Applicant: Geotab Inc., Oakville (CA)

(72) Inventors: Daniel James Beal, Stoney Creek (CA); Bruno Simione Beltrame, Milton (CA); Jaskaranbir Dhillon, Brampton (CA); Stephen Michael Fox, Oakville (CA); Sebastian Brian Hoefert, Burlington (CA); Xiaowei Huang, Markham (CA); Cristian Florin Ivascu, Hamilton (CA); Wenyang Liu, Richmond Hill (CA); Sanjeev Manickam, Kanata (CA); Aziz Omar, Hamilton (CA); Alexander Joshua Roth, Waterloo (CA); Dharati Bhaumik Shah, Kitchener (CA); Robert Swanson, Waterloo (CA); Jason-Jon Isaac Thomas, Mississauga (CA); Nicholas Willison, Ayr (CA)

(73) Assignee: Geotab Inc., Oakville ON (CA)

( * ) Notice: Subject to any disclaimer, the term of this patent is extended or adjusted under 35 U.S.C. 154(b) by 0 days.

(21) Appl. No.: 19/081,110

(22) Filed: Mar. 17, 2025

(65) Prior Publication Data

US 2025/0294331 A1     Sep. 18, 2025

Related U.S. Application Data

(60) Provisional application No. 63/566,616, filed on Mar. 18, 2024.

(51) Int. Cl.
H04N 7/18         (2006.01)
B60R 16/023       (2006.01)
(Continued)

(52) U.S. Cl.
CPC ........... H04N 7/188 (2013.01); B60R 16/023 (2013.01); G06V 20/58 (2022.01); G07C 5/008 (2013.01);
(Continued)

(58) Field of Classification Search
CPC ........ H04W 4/44; H04W 4/80; B60R 16/023; B60W 2520/10; G06V 20/58
See application file for complete search history.

(56) References Cited

U.S. PATENT DOCUMENTS 5,081,587 A     1/1992  Okano
5,182,459 A     1/1993  Okano et al.
(Continued)

FOREIGN PATENT DOCUMENTS

CN       112165698 A  *  1/2021
EP        1893452 B1     1/2010
(Continued)

*Primary Examiner* — Austin J Moreau
(74) *Attorney, Agent, or Firm* — Mark Pringle-Rigby

(57)                ABSTRACT

Multiple communication modules are used in communicating image data from an image capture device at a vehicle. Telematic data is communicated to a management server via a telematics device. An event is detected based on the telematic data. The management server requests image data from the image capture device corresponding to the event. The image capture device activates and transmits the requested image data via its own communication module in response to the request. In this way, regular, minimalistic communication is performed via the telematics device, but major data communication is performed directly by the image capture device.

18 Claims, 3 Drawing Sheets

(51) Int. Cl.

| | |
|---|---|
| *G06V 20/58* | (2022.01) |
| *G07C 5/00* | (2006.01) |
| *G07C 5/02* | (2006.01) |
| *H04N 7/035* | (2006.01) |
| *H04W 4/44* | (2018.01) |
| *H04W 4/80* | (2018.01) |

(52) U.S. Cl.

CPC .............. *G07C 5/02* (2013.01); *H04N 7/035* (2013.01); *H04N 7/185* (2013.01); *H04W 4/44* (2018.02); *H04W 4/80* (2018.02); *B60W 2520/10* (2013.01)

(56) References Cited

U.S. PATENT DOCUMENTS

| | | | |
|---|---|---|---|
| 5,262,949 | A | 11/1993 | Okano et al. |
| 5,357,141 | A | 10/1994 | Nitschke et al. |
| 5,431,441 | A | 7/1995 | Okano |
| 5,440,913 | A | 8/1995 | Crispin et al. |
| 5,788,273 | A | 8/1998 | Jeenicke et al. |
| 6,178,375 | B1 | 1/2001 | Breunig |
| 6,353,784 | B1 | 3/2002 | Miyaguchi et al. |
| 6,522,267 | B2 | 2/2003 | Flick |
| 6,640,176 | B2 | 10/2003 | Oswald et al. |
| 6,647,270 | B1 | 11/2003 | Himmelstein |
| 6,732,034 | B2 | 5/2004 | Hambsch et al. |
| 6,755,274 | B2 | 6/2004 | Mattes et al. |
| 6,765,499 | B2 | 7/2004 | Flick |
| 6,784,792 | B2 | 8/2004 | Mattes et al. |
| 6,906,622 | B2 | 6/2005 | Kleinschmidt et al. |
| 6,917,866 | B2 | 7/2005 | Grotendiek et al. |
| 7,058,040 | B2 | 6/2006 | Schmidt |
| 7,188,026 | B2 | 3/2007 | Tzamaloukas |
| 7,233,235 | B2 | 6/2007 | Pavlish |
| 7,260,153 | B2 | 8/2007 | Nissani et al. |
| 7,272,480 | B2 | 9/2007 | Mattes et al. |
| 7,295,909 | B2 | 11/2007 | Recknagel |
| 7,450,955 | B2 | 11/2008 | Himmelstein |
| 7,495,547 | B2 | 2/2009 | Lich et al. |
| 7,519,460 | B2 | 4/2009 | Roelleke et al. |
| 7,522,594 | B2 | 4/2009 | Piche et al. |
| 7,551,677 | B2 | 6/2009 | Crawford |
| 7,602,784 | B2 | 10/2009 | Piche et al. |
| 7,684,807 | B2 | 3/2010 | Schmidt |
| 7,706,946 | B2 | 4/2010 | Willig et al. |
| 7,734,394 | B2 | 6/2010 | Williams |
| 7,742,388 | B2 | 6/2010 | Shearer et al. |
| 7,747,291 | B2 | 6/2010 | Himmelstein |
| 7,822,517 | B2 | 10/2010 | Lich et al. |
| 7,907,976 | B2 | 3/2011 | Himmelstein |
| 7,933,702 | B2 | 4/2011 | Theisen |
| 7,958,962 | B2 | 6/2011 | Dukart et al. |
| 7,996,132 | B2 | 8/2011 | Park |
| 8,032,275 | B2 | 10/2011 | Lich |
| 8,134,455 | B2 | 3/2012 | Flick et al. |
| 8,138,900 | B2 | 3/2012 | Mindner et al. |
| 8,150,575 | B2 | 4/2012 | Ewerhart et al. |
| 8,600,422 | B2 | 12/2013 | Himmelstein |
| 8,706,344 | B2 | 4/2014 | Park |
| 8,768,572 | B2 | 7/2014 | Lahmann et al. |
| 8,948,961 | B2 | 2/2015 | Mack et al. |
| 8,965,695 | B2 | 2/2015 | Tzamaloukas |
| 9,043,077 | B2 | 5/2015 | Doerr et al. |
| 9,308,876 | B2 | 4/2016 | Doerr et al. |
| 9,445,270 | B1 | 9/2016 | Bicket et al. |
| 9,466,214 | B2 | 10/2016 | Fuehrer |
| 9,746,492 | B2 | 8/2017 | Rauh et al. |
| 9,921,119 | B2 | 3/2018 | Walz et al. |
| 10,057,777 | B2 | 8/2018 | Li et al. |
| 10,085,149 | B2 | 9/2018 | Bicket et al. |
| 10,186,090 | B2 | 1/2019 | Lang et al. |
| 10,206,107 | B2 | 2/2019 | Bicket et al. |
| 10,390,227 | B2 | 8/2019 | Bicket et al. |
| 10,399,524 | B2 | 9/2019 | Gross et al. |

| | | | |
|---|---|---|---|
| 10,414,368 | B2 | 9/2019 | Taranagara Joga et al. |
| 10,484,848 | B2 | 11/2019 | Cavalcanti et al. |
| 10,489,995 | B2 | 11/2019 | Capozza |
| 10,504,302 | B1 * | 12/2019 | Chavez ................. H04W 4/90 |
| 10,515,535 | B1 * | 12/2019 | Dhullipala Chenchu .................... G06V 20/59 |
| 10,587,366 | B2 | 3/2020 | Chervyakov et al. |
| 10,756,869 | B2 | 8/2020 | Khoryaev et al. |
| 10,827,324 | B1 | 11/2020 | Hajimiri et al. |
| 10,999,269 | B2 | 5/2021 | Bicket et al. |
| 11,019,553 | B1 | 5/2021 | Bhambhani et al. |
| 11,046,272 | B2 | 6/2021 | Foltin |
| 11,122,488 | B1 | 9/2021 | Lloyd et al. |
| 11,172,347 | B2 | 11/2021 | D'Addetta et al. |
| 11,190,373 | B1 | 11/2021 | Stevenson et al. |
| 11,214,212 | B2 | 1/2022 | Oesterle et al. |
| 11,247,626 | B2 | 2/2022 | Reckziegel et al. |
| 11,356,909 | B1 | 6/2022 | Lloyd |
| 11,431,537 | B2 | 8/2022 | Khoryaev et al. |
| 11,432,135 | B2 | 8/2022 | Shan |
| 11,432,220 | B2 | 8/2022 | Xu et al. |
| 11,452,115 | B2 | 9/2022 | Khoryaev et al. |
| 11,516,749 | B2 | 11/2022 | Scholand et al. |
| 11,553,503 | B2 | 1/2023 | Parron et al. |
| 11,595,995 | B2 | 2/2023 | Khoryaev et al. |
| 11,601,919 | B2 | 3/2023 | Ye et al. |
| 11,606,736 | B1 | 3/2023 | Lloyd et al. |
| 11,646,822 | B2 | 5/2023 | Zhang et al. |
| 11,659,060 | B2 | 5/2023 | Davis et al. |
| 11,670,116 | B2 | 6/2023 | Davidson |
| 11,671,907 | B2 | 6/2023 | Kedalagudde et al. |
| 11,688,211 | B1 | 6/2023 | Calmer et al. |
| 11,710,355 | B1 | 7/2023 | Wenneman et al. |
| 11,711,176 | B2 | 7/2023 | Khoryaev et al. |
| 11,736,312 | B1 | 8/2023 | Xiao et al. |
| 11,855,801 | B1 | 12/2023 | Stevenson et al. |
| 11,910,263 | B2 | 2/2024 | Xu et al. |
| 11,917,040 | B1 | 2/2024 | Mendez Rodriguez et al. |
| 11,930,082 | B1 | 3/2024 | Singh et al. |
| 11,950,182 | B2 | 4/2024 | Stojanovski et al. |
| 11,956,782 | B2 | 4/2024 | Shilov et al. |
| 11,997,181 | B1 | 5/2024 | Davis et al. |
| 11,997,530 | B2 | 5/2024 | Ali et al. |
| 11,997,741 | B1 | 5/2024 | Francis et al. |
| 12,004,111 | B2 | 6/2024 | Shan |
| 12,028,289 | B2 | 7/2024 | Ye et al. |
| 12,028,884 | B2 | 7/2024 | Panteleev et al. |
| 12,041,583 | B2 | 7/2024 | Ye et al. |
| 12,041,600 | B2 | 7/2024 | Mueck et al. |
| 12,052,602 | B2 | 7/2024 | Ali et al. |
| 12,052,743 | B2 | 7/2024 | Panteleev et al. |
| 12,058,562 | B2 | 8/2024 | Khoryaev et al. |
| 12,063,505 | B2 | 8/2024 | Guo et al. |
| 12,063,657 | B2 | 8/2024 | Panteleev et al. |
| 12,089,278 | B2 | 9/2024 | Wu et al. |
| 12,113,746 | B2 | 10/2024 | Panteleev et al. |
| 12,120,581 | B1 | 10/2024 | Gal et al. |
| 2006/0276199 | A1 | 12/2006 | Flick |
| 2014/0300739 | A1 * | 10/2014 | Mimar .............. G06Q 30/0283 348/148 |
| 2016/0082952 | A1 * | 3/2016 | Kang ...................... H04W 4/14 701/2 |
| 2017/0339095 | A1 * | 11/2017 | Lei ........................ H04L 67/141 |
| 2017/0341611 | A1 * | 11/2017 | Baker ..................... B60R 21/16 |
| 2019/0206150 | A1 | 7/2019 | Zucconelli et al. |
| 2019/0236861 | A1 | 8/2019 | Amendolagine et al. |
| 2019/0389487 | A1 * | 12/2019 | Gowda .................. B60Q 1/507 |
| 2020/0312063 | A1 * | 10/2020 | Balakrishnan .......... B60Q 9/00 |
| 2021/0120595 | A1 | 4/2021 | Singh et al. |
| 2021/0136699 | A1 | 5/2021 | Scholand et al. |
| 2021/0195386 | A1 | 6/2021 | Hajimiri et al. |
| 2021/0261140 | A1 * | 8/2021 | Kallepalle .............. G06V 20/56 |
| 2021/0380059 | A1 | 12/2021 | Jones et al. |
| 2022/0024400 | A1 | 1/2022 | Ahmad et al. |
| 2022/0159628 | A1 | 5/2022 | Bangolae et al. |
| 2022/0311582 | A1 | 9/2022 | Ye et al. |
| 2022/0417820 | A1 | 12/2022 | Xu et al. |
| 2023/0125160 | A1 | 4/2023 | Sirotkin et al. |
| 2023/0144397 | A1 | 5/2023 | Ye et al. |

(56)     References Cited

U.S. PATENT DOCUMENTS

| | | | |
|---|---|---|---|
| 2023/0156792 A1 | 5/2023 | Yao et al. | |
| 2023/0171314 A1 | 6/2023 | Onti Srinivasan et al. | |
| 2023/0209553 A1 | 6/2023 | Ye et al. | |
| 2023/0247271 A1* | 8/2023 | Mirchef | H04N 23/54 |
| | | | 348/148 |
| 2023/0260049 A1* | 8/2023 | Brandmaier | G08G 1/205 |
| | | | 280/729 |
| 2024/0003749 A1 | 1/2024 | Lin et al. | |
| 2024/0096139 A1 | 3/2024 | Mesde et al. | |
| 2024/0098746 A1 | 3/2024 | Ye et al. | |
| 2024/0146629 A1 | 5/2024 | Lloyd | |
| 2024/0217555 A1 | 7/2024 | Shin | |
| 2024/0224235 A1 | 7/2024 | Miao | |
| 2024/0333802 A1 | 10/2024 | Mesde et al. | |
| 2025/0111705 A1* | 4/2025 | Harvey | G06V 20/58 |

FOREIGN PATENT DOCUMENTS

| | | | |
|---|---|---|---|
| EP | 2147829 | B1 | 3/2012 |
| EP | 2289753 | B1 | 2/2013 |
| EP | 2261087 | B1 | 3/2013 |
| EP | 2261089 | B1 | 3/2013 |
| EP | 2398676 | B1 | 5/2013 |
| EP | 2311691 | B1 | 12/2013 |
| EP | 3529789 | B1 | 10/2020 |
| EP | 3873780 | A1 | 9/2021 |
| EP | 3768558 | B1 | 2/2022 |
| WO | 2023240262 | A1 | 12/2023 |

* cited by examiner

SYSTEMS, DEVICES, AND METHODS FOR COMMUNICATING VEHICLE-RELATED IMAGE DATA

This application claims priority to U.S. Provisional Patent Application No. 63/566,616, titled "Systems, Devices, and Method for Communicating Vehicle-Related Image Data", filed on Mar. 18, 2024.

TECHNICAL FIELD

The present disclosure generally relates to systems, devices, and methods for managing image data, and in particular relates to transmitting image data amongst vehicle-related devices.

BACKGROUND

Image capture devices can be positioned at vehicles. Such image capture devices capture image data, which can be provided to a management server. However, image data is typically large in size, and requires significant transmission bandwidth to communicate. It is desirable to provide a means for optimizing efficiency of how image data is communicated from an image capture device at a vehicle.

SUMMARY

According a broad aspect, the present disclosure describes a system comprising: a management server having a first at least one communication module, a first at least one processor, and a first at least one non-transitory processor readable storage medium storing first processor-executable instructions thereon; a telematics device positioned at a vehicle, a second communication module, a third communication module, a second at least one processor, and a second at least one non-transitory processor readable storage medium storing second processor-executable instructions thereon; and an image capture device positioned at the vehicle, the image capture device having at least one image sensor, a fourth communication module, a fifth communication module, a third at least one processor, and a third at least one non-transitory processor readable storage medium storing third processor-executable instructions thereon, wherein: the third processor-executable instructions cause the image capture device to: capture, by the at least one image sensor, image data; and store, by the third at least one non-transitory processor-readable storage medium, the image data; the second processor-executable instructions cause the telematics device to: receive telematic data for the vehicle; and transmit, by the third communication module for reception at the management server, the telematic data; the first processor-executable instructions cause the management server to: receive, by the first at least one communication module, the telematic data; apply, by the first at least one processor, an event detection model to the telematic data to detect an event at the vehicle; and in response to detecting the event at the vehicle, transmit, by the first at least one communication module for reception at the telematics device, a request for image data corresponding to a time period of the event; the second processor-executable instructions further cause the telematics device to: receive, by the third communication module, the request for image data; and transmit, by the second communication module, the request for image data for reception at the image capture device; and the third processor-executable instructions further cause the image capture device to: receive, by the fourth communication module, the request for image data; access, at the third at least one non-transitory processor-readable storage medium, image data corresponding to the time period; and transmit, by the fifth communication module, the image data corresponding to the time period.

The fourth communication module and the second communication module may comprise respective wired communication modules, for wired communication between the telematics device and the image capture device. The fourth communication module and the second communication module may comprise respective short-range wireless communication interfaces. The fifth communication module may comprise a first cellular modem at the image capture device which communicates over a first cellular network. The third communication module may comprise a second cellular modem at the telematics device which communicates over the first cellular network or a second cellular network different from the first cellular network.

The first at least one communication module may comprise a network module which communicatively couples to a cloud network or the internet.

The fifth communication module may normally be in an inactive mode where communication with the management server is not enabled, and the third processor executable instructions which cause the image capture device to transmit the image data corresponding to the time period further cause the image capture device to: operate the fifth communication module in an active mode where communication with the management server is enabled. The third processor-executable instructions may further cause the image capture device to: after transmitting the image data corresponding to the time period, operate the fifth communication module in the inactive mode.

The telematic data may include at least inertial data for the vehicle; the event is a collision; and the first processor-executable instructions which cause the first at least one processor to apply the event detection model to the telematic data cause the first at least one processor to: apply a collision detection model to at least the inertial data to detect the collision. 10. The telematic data may further include speed data for the vehicle; and the first processor-executable instructions which cause the first at least one processor to apply a collision detection model to at least the inertial data to detect the collision may cause the first at least one processor to: apply the collision detection model to the inertial data and the speed data to detect the collision.

The telematic data may include at least inertial data for the vehicle; the event may be a harsh motion event comprising at least one of a harsh turn event, a harsh brake event, or a harsh acceleration event; and the first processor-executable instructions which cause the first at least one processor to apply the event detection model to the telematic data may cause the first at least one processor to: apply a harsh motion detection model to at least the inertial data to detect the harsh motion event. The telematic data may further include speed data for the vehicle; and the first processor-executable instructions which cause the first at least one processor to apply a harsh motion detection model to at least the inertial data to detect the harsh motion event may cause the first at least one processor to: apply the harsh motion detection model to the inertial data and the speed data to detect the harsh motion event.

The image capture device may further comprise an emergency user interface; in response to activation of the emergency user interface by a driver of the vehicle, the third processor executable instructions may cause the image capture device to transmit an emergency indication to the telematics device by the fourth communication module; the second processor-executable instructions may further cause the telematics device to receive the emergency indication by the second communication module; the second processor-executable instructions which cause the telematics device to transmit the telematic data by the third communication module may further cause the telematics device to transmit the emergency indication with the telematic data; and the first processor-executable instructions which cause the first at least one processor to apply the event detection model to the telematic data may cause the first at least one processor to: detect the event based on the emergency indication.

The telematic data may include speed data for the vehicle; the event may be a speeding event where a speed of the vehicle exceeds a speed threshold; and the first processor-executable instructions which cause the first at least one processor to apply the event detection model to the telematic data may cause the first at least one processor to: apply a speeding detection model to the speed data to detect the speeding event.

The third processor-executable instructions may further cause the third at least one processor to collect following distance data between the vehicle and another vehicle in front of the vehicle, by applying a following distance detection model to the captured image data; the third processor executable instructions may further cause the image capture device to transmit at least a portion of the following distance data to the telematics device by the fourth communication module; the second processor-executable instructions may further cause the telematics device to receive the at least a portion of the following distance data; the second processor-executable instructions which cause the telematics device to transmit the telematic data by the third communication module may further cause the telematics device to transmit the at least a portion of the following distance data with the telematic data; the event may comprise a tailgating event where a following distance between the vehicle and the other vehicle is below a threshold; and the first processor-executable instructions which cause the first at least one processor to apply the event detection model to the telematic data may cause the first at least one processor to: apply a tailgating detection model to the at least a portion of the following distance data.

The telematics device may further comprise a data port communicatively couplable to the vehicle, by which the telematics device receives at least a portion of the telematic data.

The telematics device may further comprise at least one sensor which captures at least a portion of the telematic data, the at least one sensor selected from a group of sensors consisting of: an inertial sensor; a location sensor; and a speed sensor.

The first processor-executable instructions may further cause the management server to: receive, by the first at least one communication module, the image data corresponding to the time period from the image capture device.

The system may further comprise a remote datastore which receives the image data corresponding to the time period from the image capture device.

The first processor-executable instructions may further cause the management server to transmit, by the first communication module, a wake command for reception at the telematics device; and the second processor-executable instructions may further cause the telematics device to wake in response to the wake command, prior to transmitting the request for image data by the second communication module for reception at the image capture device. The first processor-executable instructions which cause the first communication module to transmit the wake command may cause the first communication module to transmit the wake command prior to transmitting the request for image data for reception at the telematics device.

The second processor-executable instructions may further cause the telematics device to transmit, by the second communication module, a wake command for reception at the image capture device; and the third processor-executable instructions may further cause the image capture device to wake in response to the wake command, prior to accessing the image data corresponding to the time period. The second processor-executable instructions which cause the second communication module to transmit the wake command may cause the second communication module to transmit the wake command prior to transmitting the request for image data.

According to another broad aspect, the present disclosure describes a method performed between a management server having a first communication module, a telematics device having a second communication module and a third communication module, and an image capture device have a fourth communication module and a fifth communication module, the method comprising: capturing, by at least one image sensor of the image capture device, image data; and storing, by at least one non-transitory processor-readable storage medium of the image capture device, the image data; receiving, by the telematics device, telematic data for a vehicle where the image capture device and the telematics device are positioned; and transmitting, by the third communication module of the telematics device to the first communication module of the management server, the telematic data; applying, by at least one processor of the management server, an event detection model to the telematic data to detect an event at the vehicle; and in response to detecting the event at the vehicle, transmitting, by the first at least one communication module of the management server to the third communication module of the telematics device, a request for image data corresponding to a time period of the event; transmitting, by the second communication module of the telematics device to the fourth communication module of the image capture device, the request for image data; accessing, at the at least one non-transitory processor-readable storage medium of the image capture device, image data corresponding to the time period; and transmitting, by the fifth communication module, the image data corresponding to the time period to the first communication module of the management server.

The fifth communication module may normally be in an inactive mode where communication with the management server is not enabled, and transmitting the image data may further comprise: operating the fifth communication module in an active mode where communication with the management server is enabled. The method may further comprise: after transmitting the image data, operating the fifth communication module in the inactive mode.

The telematic data may include at least inertial data for the vehicle; the event may be a collision; and applying the event detection model to the telematic data may comprise: applying a collision detection model to at least the inertial data to detect the collision. The telematic data may further include speed data for the vehicle; and applying the collision detection model to at least the inertial data to detect the collision may comprise: applying the collision detection model to the inertial data and the speed data to detect the collision.

The telematic data may include at least inertial data for the vehicle; the event may be a harsh motion event comprising at least one of a harsh turn event, a harsh brake event, or a harsh acceleration event; and applying the event detection model to the telematic data may comprise: applying a harsh motion detection model to at least the inertial data to detect the harsh motion event. The telematic data may further include speed data for the vehicle; and applying the harsh motion detection model to at least the inertial data to detect the harsh motion event may comprise: applying the harsh motion detection model to the inertial data and the speed data to detect the harsh motion event.

The method may further comprise, in response to activation of an emergency user interface of the image capture device by a driver of the vehicle, transmitting an emergency indication by the fourth communication module of the image capture device to the second communication module of the telematics device; transmitting the telematic data by the third communication module to the first communication module may further comprise transmitting the emergency indication with the telematic data; and applying the event detection model to the telematic data may comprise: detecting the event based on the emergency indication.

The telematic data may include speed data for the vehicle; the event may be a speeding event where a speed of the vehicle exceeds a speed threshold; and applying the event detection model to the telematic data may comprise applying a speeding detection model to the speed data to detect the speeding event.

The method may further comprise: collecting, at the image capture device, following distance data between the vehicle and another vehicle in front of the vehicle, by applying a following distance detection model to the captured image data; and transmitting, by the fourth communication module at the image capture device to the second communication module at the telematics device, at least a portion of the following distance data to the telematics device by the fourth communication module, and transmitting the telematic data by the third communication module may comprise transmitting the at least a portion of the following distance data with the telematic data; the event may comprise a tailgating event where a following distance between the vehicle and the other vehicle is below a distance threshold; and applying the event detection model to the telematic data may comprise applying a tailgating detection model to the at least a portion of the following distance data.

Receiving the telematics data may comprise receiving at least a portion of the telematic data via a data port which communicatively couples to the vehicle.

Receiving the telematics data may comprise capturing at least a portion of the telematic data by at least one sensor of the telematic device, the at least one sensor selected from a group of sensors consisting of: an inertial sensor; a location sensor; and a speed sensor.

The method may further comprise: transmitting, by the first communication module, a wake command for reception at the telematics device; and in response to the wake command, waking the telematics device prior to transmitting the request for image data by the second communication module for reception at the image capture device. Transmitting the wake command by the first communication module may comprise transmitting the wake command prior to transmitting the request for image data for reception at the telematics device.

The method may further comprise: transmitting, by the second communication module, a wake command for reception at the image capture device; and in response to the wake command, waking the image capture device prior to accessing the image data corresponding to the time period. Transmitting the wake command by the second communication module may comprise transmitting the wake command prior to transmitting the request for image data.

BRIEF DESCRIPTION OF THE DRAWINGS

Exemplary non-limiting embodiments are described with reference to the accompanying drawings in which.

DETAILED DESCRIPTION

Figure 1:
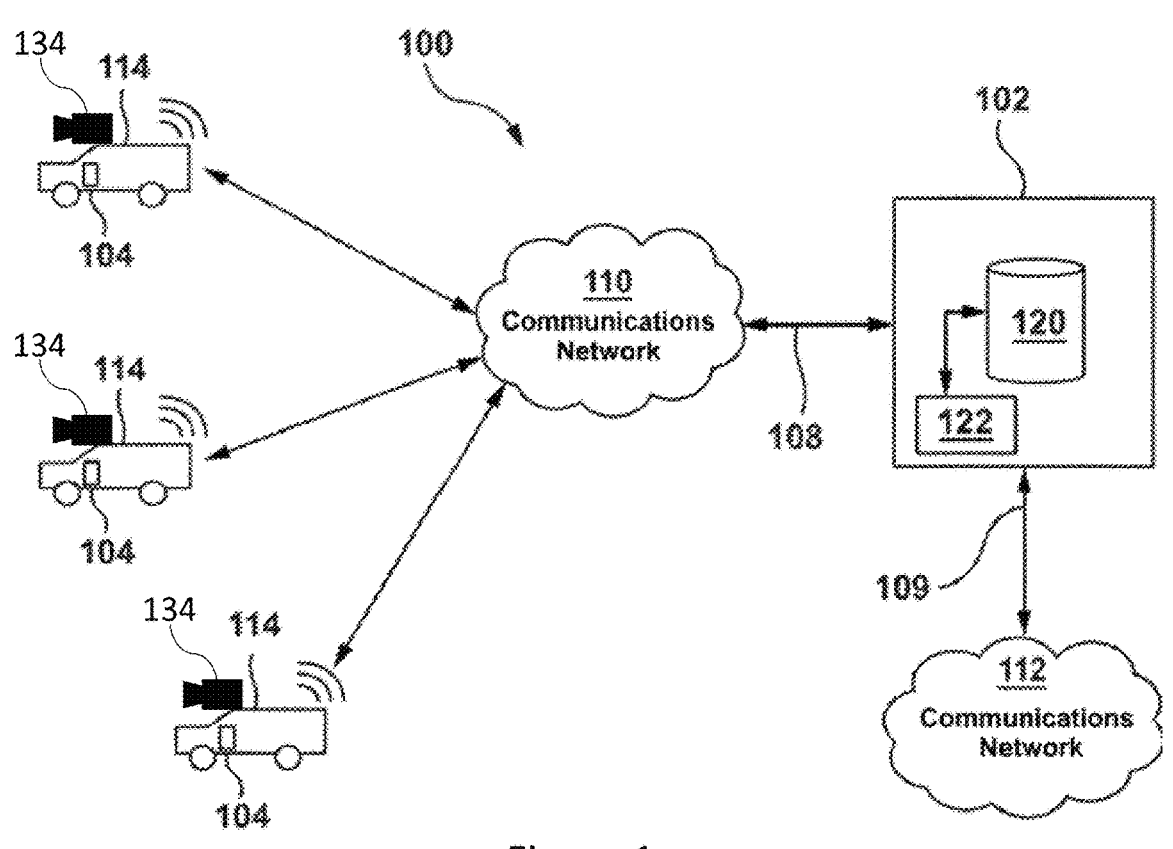
FIG. 1 is a schematic view of a telematics system.

The present disclosure details systems, methods, and devices for communicating image data pertaining to at least one vehicle. The present disclosure sees particular value in vehicle data collection systems, where telematics devices and coupled image capture devices are positioned at vehicles.

Telematics systems have been employed by fleet owners to monitor use and performance of vehicles in the fleet. A telematics system monitors a vehicle using an onboard telematics device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematics device may detect environmental operating conditions associated with a vehicle, for example, outside temperature, attachment status of an attached trailer, and temperature inside an attached refrigeration trailer. A telematics device may also detect operating conditions of an associated vehicle, such as position, (e.g., geographic coordinates), speed, and acceleration, time of day of operation, distance traveled, stop duration, customer location, idling duration, driving duration, among others. Hence, the telematics device collects and transmits data to the telematics system that is representative of the vehicle operation and usage execution. This data may be collected over a time period of sufficient duration to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematics device to a remote subsystem, (e.g., data management system which may comprise a cloud system or a management system). Raw vehicle data may include information indicating the identity of the onboard telematics device (e.g., device identifier, device ID) and/or the identity of the associated vehicle the onboard telematics device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematics device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem. Throughout this application, vehicle data collected, processed, and/or transmitted by a telematics monitoring device can be broadly included in "telematic data", among other types of data such as location data discussed later.

In other exemplary telematics systems, a telematics device can have at least one processing unit thereon which processes or filters raw vehicle data, and transmits processed or filtered data. Such systems can reduce the bandwidth required for transmission and required storage capacity for transmitted data.

The use of telematics systems has resulted in improved performance and maintenance of vehicles in the fleet. Additionally, data from telematics systems can also be useful to analyze traffic, to provide information for infrastructure design, planning, and implementation.

Illustrated in FIG. 1 is a simplified block diagram of an exemplary telematics system for gathering and storing vehicle operation information. Telematics system 100 comprises telematics subsystem 102 having a first network interface 108 and onboard telematics devices 104 of vehicles 114 communicatively coupled therewith via communication network 110.

The telematics subsystem 102 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, telematics subsystem 102 includes at least one non-transitory processor-readable storage medium 120 and at least one processor 122. The at least one non-transitory processor-readable storage medium 120 can store data on which analytics is performed, and/or can store instructions thereon. Said instructions, when executed by the at least one processor 122, cause the telematics subsystem to perform the desired operations, analysis, or data collection/aggregation. The telematics subsystem 102 can also be referred to as a management server. Such a management server can be a single device, or can be a distributed arrangement as discussed above.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi™, Bluetooth™, Ethernet, HTTP/S, TCP, and CoAP/DTLS, or other suitable protocol. Communication network 110 may take other forms as well.

Telematics system 100 may comprise another network interface 109 for communicatively coupling to another communication network 112. In an implementation, communication network 112 may comprise a communication gateway between the fleet owners and the telematics system 100.

Also shown in FIG. 1 are vehicles 114, each thereof having aboard the onboard telematics devices 104. A vehicle may include a car, truck, recreational vehicle, heavy equipment, tractor, snowmobile, or other transportation asset. Onboard telematics devices 104 may transmit raw vehicle data associated with vehicles 114 through the communication network 110 to the telematics subsystem 102.

Three telematics devices 104 are described in this example for explanation purposes only and embodiments are not intended to be limited to the examples described herein. In practice, a telematics system may comprise many vehicles 114, such as hundreds, thousands and tens of thousands or more. Thus, huge volumes of raw vehicle data may be received and stored by remote telematics subsystem 102.

In general, telematics devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematics device 104 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed. Alternatively, the telematics device 104 may communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle 114 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematics device 104 may comprise a monitoring module operable to communicate with a data/communication bus of vehicle 114. The monitoring module may communicate via a direct connection, such as, electrically coupling, with a data/communication bus of vehicle 114 via a vehicle communication port, (e.g., diagnostic port/communication bus, OBDII port). Alternatively, the monitoring module may comprise a wireless communication interface for communicating with a wireless interface of the data/communication bus of vehicle 114. Optionally, a monitoring module may communicate with other external devices/systems that detect operating conditions of the vehicle.

Telematics device 104 may be configured to wirelessly communicate with telematics subsystem 102 via a wireless communication module. In some embodiments, telematics device 104 may directly communicate with one or more networks outside vehicle 114 to transmit data (such as telematic data) to telematics subsystem 102. A person of ordinary skill will recognize that functionality of some modules may be implemented in one or more devices and/or that functionality of some modules may be integrated into the same device.

Telematics devices 104 may transmit raw vehicle data (or telematic data), indicative of vehicle operation information collected thereby, to telematics subsystem 102. The raw vehicle data may be transmitted at predetermined time intervals, (e.g. heartbeat), intermittently, and/or according to other predefined conditions. Raw vehicle data (or telematic data) transmitted from telematics devices 104 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

Also shown in FIG. 1 are image sensors 134, each aboard a respective vehicle 104. Each of image sensor 134 could for example be a camera, such as a video camera. Such image sensors capture image data (or video data, as a sequence of images) in a field of view of the respective image sensor. In some cases, an image sensor is positioned and oriented to capture image data representing a field of view outside the vehicle (e.g. a dash cam, rear view cam, or other camera pointed externally to the vehicle). In some cases, an image sensor is positioned and oriented to capture image data representing a field of view inside the vehicle (e.g. a driver-facing camera, a camera aimed at an instrument panel, or other camera pointed internally in the vehicle). In some cases, a vehicle can have multiple image sensors positioned thereat.

Similar to telematic data, image data captured by image sensors 134 can be transmitted to telematics subsystem 102 by communications network 110. In some implementations, communication hardware of telematics devices can have limited bandwidth capabilities. For example, transmission speed or quantity from a telematics device can be throttled to reduce power consumption. As another example, a telematics device may be old, such that the communication hardware thereon is inherently limited in capabilities. In such cases, communication hardware of the telematics device may be inadequate or inappropriate for transmitting image data from an image sensor 134 over communications network 110. To address this, image sensors 134 include dedicated communication hardware for communicating over communications network 110. This is described in detail with reference to FIG. 2 below.

Figure 2:
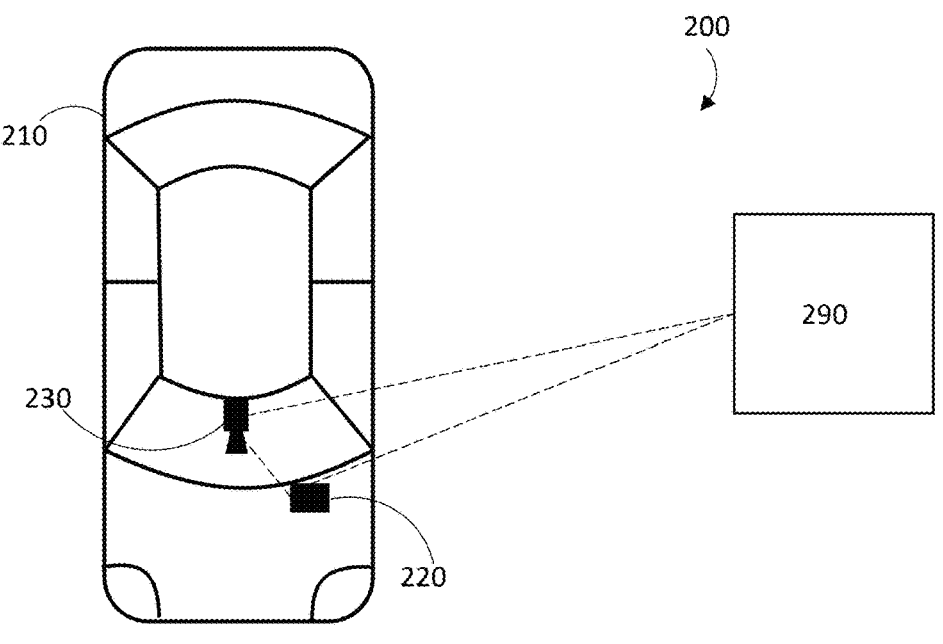
FIG. 2 is a schematic view of a system of devices which are pertinent to a vehicle, in accordance with at least one illustrated example.

FIG. 2 is a schematic diagram which illustrates an exemplary system 200, where an image capture device and telematics device are positioned at a vehicle and able to communicate with a management server remote from the vehicle. In particular, FIG. 2 shows a vehicle 210. In the illustrated example, vehicle 210 is a sedan-type car, but this discussion applies to any appropriate type of vehicle, such as those discussed earlier. A telematics device 220 is positioned at vehicle 210. The telematics device 220 could be installed (permanently or removably) to the vehicle 210. For example, the telematics device may comprise a monolithic device which plugs into a data port of vehicle 210 (such as the OBDII port) to receive power and data from the vehicle. As another example, the telematics device 220 may comprise multiple components positioned in different locations of the vehicle which communicate with each other. An image capture device 230 is also positioned at vehicle 210. In the illustrated example, the image capture device 230 is installed to vehicle 210 so as to look out the front windshield of vehicle 210. In alternative implementations, more than one image capture device can be positioned at the vehicle, pointed in any appropriate direction (e.g. a rear-facing camera, in-cab facing camera, side facing cameras, etc.) A plurality of image sensors can be implemented collectively as an image capture device (e.g. the image capture sensors are controlled commonly in a common device), or as a plurality of respective image capture devices. Telematic device 220 and image capture device 230 are communicatively coupled with each other; detailed implementations are discussed later with reference to FIG. 3.

FIG. 2 also shows a management server 290. As discussed earlier with reference to telematics subsystem 102, management server 290 can comprise one device, or can comprise a plurality of devices or distributed computing resources (e.g. over a cloud or server warehouse). Telematic device 220 and image capture device 230 are each communicatively coupled to management server 290. While FIG. 2 illustrates this communicative coupling in a direct manner, the communicative coupling can be indirect (e.g. over a communication network such as a cellular or internet network.

Figure 3:
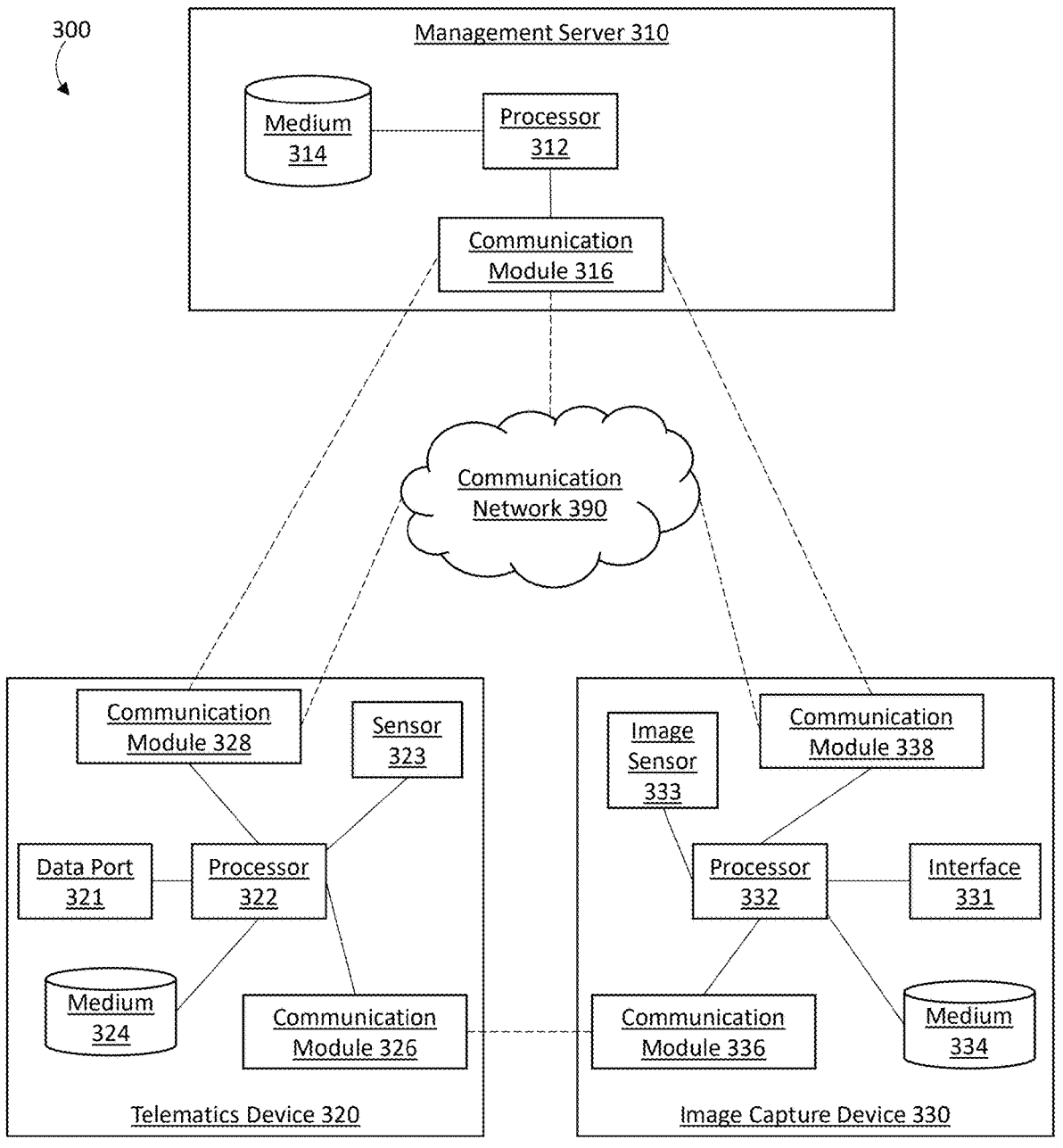
FIG. 3 is a schematic view of a system of devices which communicate with each other, in accordance with at least one illustrated example.

FIG. 3 is a schematic diagram showing a system 300 including exemplary hardware for the management servers, telematics devices, and image capture devices discussed herein. The hardware shown in FIG. 3 is not exhaustive, and any appropriate additional hardware can be included in each of the devices.

FIG. 3 shows a management server 310, which includes a first at least one processor 312, a first at least one non-transitory processor-readable storage medium 314, and a first communication module 316. The first at least one non-transitory processor-readable storage medium 314 can store (among other data) processor-executable instructions which, when executed by the first at least one processor 312, control operation of the management server 310 (e.g. cause the management server 310 to perform any appropriate actions, such as actions in method 400 discussed later with reference to FIG. 4).

FIG. 3 also shows a telematics device 320, which includes a second at least one processor 322, a second at least one non-transitory processor-readable storage medium 324, a second communication module 326, and a third communication module 328. Telematics device 320 also includes means for receiving, collecting, or capturing telematic data as described earlier. In the illustrated example in FIG. 3, telematics device 320 includes a data port 321, which connects to a corresponding port of a vehicle (e.g. a diagnostics port such as an OBDII port), in order to receive vehicle-related data from the vehicle (which can also be considered as telematic data). Also in the illustrated example, telematics device 320 includes at least one sensor 323, which captures sensor data related to the vehicle (such as location data, inertial data, or any other appropriate type of sensor data as discussed earlier). Sensor 323 can include a plurality of sensors which collect sensor data of corresponding types. Of particular note, sensor 323 can include an inertial sensor which captures inertial data for the vehicle where the telematics device 320 is positioned. Such an inertial sensor could be, for example, an accelerometer or IMU (inertial measurement unit). Further, sensor 323 can include a speed sensor which captures speed data for the vehicle, and/or a location sensor which captures location data for the vehicle (e.g. GPS coordinates). The second at least one non-transitory processor-readable storage medium 324 can store (among other data) processor-executable instructions which, when executed by the second at least one processor 322, control operation of the telematics device 320 (e.g. cause the telematics device 320 to perform any appropriate actions, such as actions in method 400 discussed later with reference to FIG. 4).

FIG. 3 also shows an image capture device 330 which includes at least one third processor 332, at least one third non-transitory processor-readable storage medium 334, a fourth communication module 336, and a fifth communication module 338. Image capture device 330 also includes at least one image sensor 333, which can capture image data pertinent to a vehicle in which the image capture device is installed (such as the perspective of images discussed earlier). Image capture device 330 in some implementations includes a plurality of image sensors, which can be pointed in similar directions (e.g. for binocular vision) or in different directions (e.g. to capture additional image data related to the vehicle). The third at least one non-transitory processor-readable storage medium 334 can store (among other data) processor-executable instructions which, when executed by the second at least one processor 332, control operation of the image capture device 330 (e.g. cause the image capture device 330 to perform any appropriate actions, such as actions in method 400 discussed later with reference to FIG. 4).

Optionally, image capture device 330 includes a user interface 331. The user interface can include an emergency user interface (such as a panic button) which can be used to trigger communication of image data, as discussed in detail later. User interface 331 is not limited to being a button, but could be for example a capacitive surface which detects touch by a user, a switch, or any other appropriate interface.

The labels "first", "second", "third", "fourth", and "fifth" are merely to label different components, and do not indicate or imply any specific sequence or ordinance of components.

The first communication module 316, third communication module 328, and fifth communication module 338 are long-range communication modules, for communication between management server 310 and telematics device 320 and/or image capture device 330. For example, communication modules 316, 328, and 338 can be cellular modems, which enable communication of management server 310, telematics device 320, and image capture device 330 over at least one cellular network. Such a cellular network is one example of communication network 390 shown in FIG. 3, via which management server 310 communicates with telematics device 320 and image capture device 330. Communication network 390 is optional, and in some implementations management server 310 could communicate directly with telematics device 320 and image capture device 330, as also shown in FIG. 3 by dashed lines. The first communication module 316, third communication module 328, and fifth communication module 338 do not all have to be the same type of modules, nor is communication network 390 limited to a single communication network. For example, communication module 316 can be an internet capable module (e.g. an ethernet port, a wireless network module such as a WiFi® module, or any other appropriate module) which connects to the internet; communication module 328 can be a cellular modem which connects to a cellular network of a first cellular provider; and communication module 338 can be a cellular modem which connects to a cellular network of a second cellular provider. In such an implementation, each of the first communication module 316, third communication module 328, and fifth communication module 338 connect to the internet and communicate over the internet, but via different mechanisms.

Second communication module 326 and fourth communication module 336 are generally short-range communication modules. In some implementations, second communication module 326 and fourth communication module 336 can be wired communication modules (such as USB ports), such that telematics device 320 and image capture device 330 communicate with each other over a wired connection. In other implementations, second communication module 326 and fourth communication module 336 are wireless communication modules, such as Bluetooth®, Zigbee™, WiFi™, or any other appropriate type of short-range wireless connection.

Figure 4:
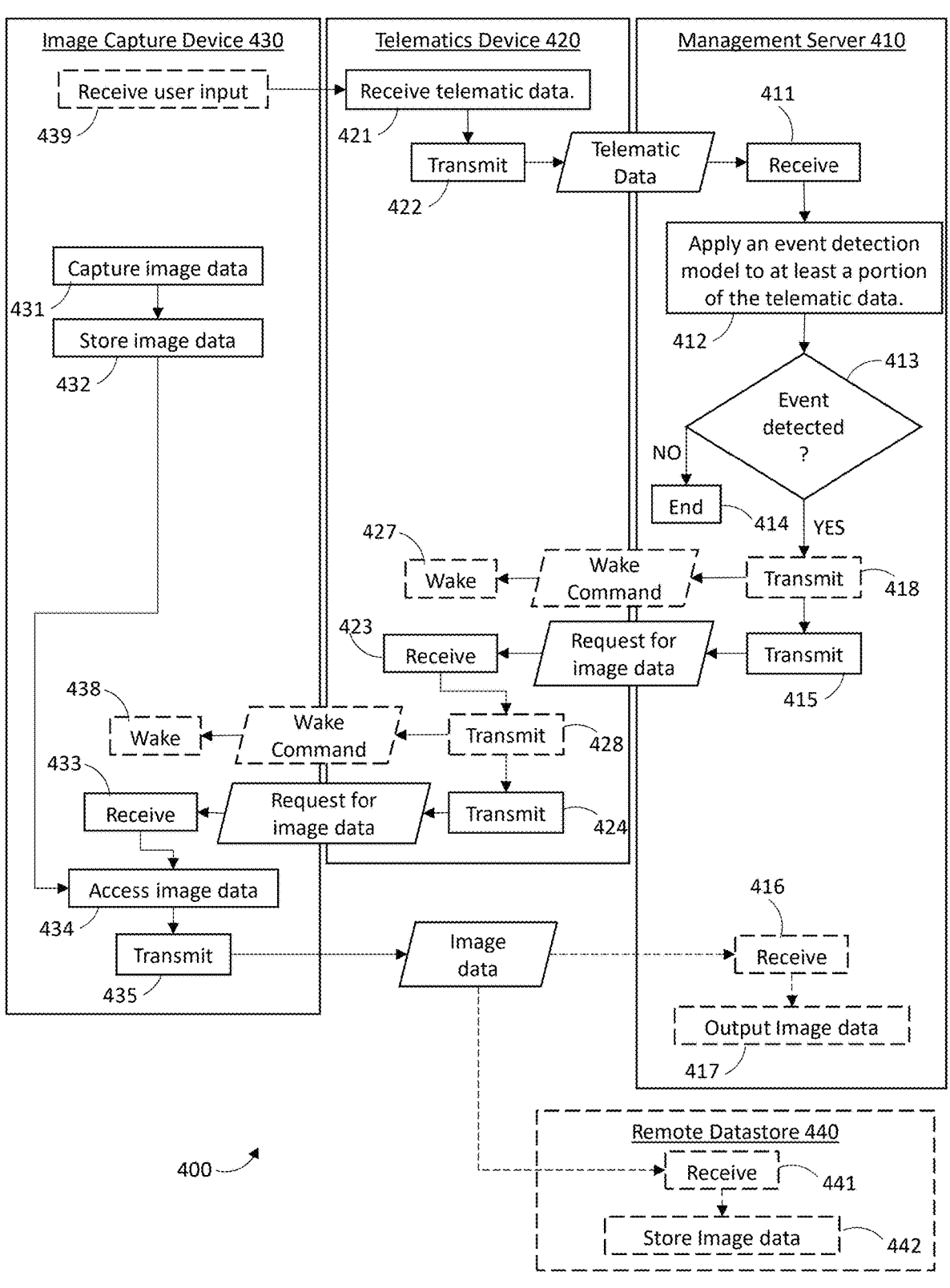
FIG. 4 is a flowchart diagram of a method for requesting image data from an image capture device.

FIG. 4 is a flowchart diagram which illustrates an exemplary method 400 for communicating image data. Method 400 as illustrated includes acts performed by a management server 410 (illustrated as acts 411, 412, 413, 414, 415, 416, 417, and 418), acts performed by a telematics device 420 (illustrated as acts 421, 422, 423, 424, 427, and 428), and acts performed by an image capture device 430 (illustrated as acts 431, 432, 433, 434, 435, 438, and 439). One skilled in the art will appreciate that additional acts could be added, acts could be removed, or acts could be reordered as appropriate for a given application.

With reference to the examples illustrated in FIGS. 1, 2, and 3, acts can be performed by appropriate components of systems such as system 100 in FIG. 1, system 200 in FIG. 2, and/or system 300 in FIG. 3. For example, acts of transmission and reception can be performed by appropriate communication modules; acts of preparing messages, applying models, or determination can be performed by an appropriate at least one processor; acts of storing or providing access can be performed by an appropriate at least one non-transitory processor-readable storage medium. Further, any of the discussed at least one non-transitory processor-readable storage mediums can have processor-executable instructions stored thereon, which when executed by a respective at least one processor cause a respective device or component to perform a given act of method 400.

Acts 439, 418, 427, 428, and 438 are optional, as discussed in detail later.

At 431, the image capture device 430 captures image data. In particular, at least one image sensor of the image capture device (e.g. the at least one image sensor 333 in FIG. 3) captures image data pertinent to the vehicle at which the image capture device is positioned. This can comprise a plurality of image sensors capturing respective image data, in implementations which include a plurality of image sensors.

At 432, the image data captured at 431 is stored by at least one non-transitory processor-readable storage medium of the image capture device (e.g. by third non-transitory processor-readable storage medium 334 in FIG. 3).

The capturing and storing of image data in acts 431 and 432 is continuous, regular, or otherwise recurring. For example, a rolling stream or buffer of image data can be captured and stored, with the oldest portions of the image data being deleted or overwritten to make room for newly captured image data. The captured image data can be continuously captured at an appropriate frame rate set for the image capture device (e.g. 15, 30, or 60 frames per second). Alternatively, the image data can be captured periodically in intervals (e.g. image data is captured every 10, 20, 30 or 60 seconds). The numerical examples of capture frequency and frame rate are merely exemplary, and can be adjusted as appropriate for a given implementation.

At 421, the telematics device 420 receives telematic data. In some implementations, the telematic data is received from the vehicle (e.g. via data port 321). In some implementations, receiving the telematic data comprises capturing the telematic data by at least one sensor (e.g. sensor 323). In some implementations, receiving the telematic data comprises receiving a portion of the telematic data from the vehicle (e.g. via data port 321) and capturing another portion of the telematic data by the at least one sensor (e.g. sensor 323).

In some implementations, the telematic data includes at least inertial data. In particular, at least one inertial sensor of the telematics device (e.g. the at least one sensor 323 in FIG. 3) can capture inertial data pertinent to the vehicle at which the telematics device is positioned, or the inertial data can be received by the telematics device from the vehicle (e.g. over data port 321). This could comprise an accelerometer capturing acceleration data for the vehicle, an inertial measurement unit (IMU) capturing inertial data for the vehicle, or any other appropriate type of sensor capturing inertial data.

In some implementations, the telematic data includes at least speed data. In particular, at least one speed sensor of the telematics device (e.g. the at least one sensor 323 in FIG. 3) can capture speed data pertinent to the vehicle at which the telematics device is positioned, or the speed data can be received by the telematics device from the vehicle (e.g. over data port 321).

In some implementations, the telematic data includes at least location data. In particular, at least one location sensor of the telematics device (e.g. the at least one sensor 323 in FIG. 3) can capture location data pertinent to the vehicle at which the telematics device is positioned, or the location data can be received by the telematics device from the vehicle (e.g. over data port 321).

The various telematic data in some implementations can be derived data from other sensors. For example, speed data could be derived as change in location as indicated in location data. As another example, speed data could be derived based on wheel rotation and circumference as measured by a tachometer or similar. As yet another example, acceleration data could be derived from speed or location data captured by at least one speed or location sensor. Further, the telematic data can be captured or derived from more than one sensor (e.g. multiple sensors in combination, or data from multiple sensors can each be included in the telematic data). Further, any other appropriate data can be included in the telematic data as discussed with reference to FIG. 1, such as speed data, location data, or vehicle weight data as non-limiting examples. Depending on an event detection model discussed later with reference to act 412, various types of data may be used from the telematic data for the purposes of method 400.

At 422, the telematics device 420 transmits the telematic data received at 421. This transmission is intended for reception at management server 410, and is transmitted by a communication module which can communicate with the management server (such as the third communication module 328 in FIG. 3). The telematic data does not necessarily need to be transmitted at a frequency the telematic data is captured. Rather, in some implementations the telematic data can be transmitted in blocks periodically to reduce active time of the long-range communication module of the telematics device. Further, in some implementations, the telematic data can be "curve logged", whereby the telematic data is transmitted only when a change between points of respective data (e.g. inertial data) exceeds a curve logging threshold. That is, in some implementations act 422 occurs only when differences between points of respective telematic data (e.g. inertial data) is significant enough.

At 411, the telematic data from the telematics device 420 is received by the management server 410, by a communication module which can communicate with the telematics device (such as first communication module 316 in FIG. 3). Throughout this disclosure, acts of "receiving" data or information can include any appropriate aspects of such reception, such as intaking, formatting, decompressing, processing, interpreting, or any other actions, as appropriate in a given context.

At 412, the management server 410 applies an event detection model to at least a portion of the telematic data received from the telematics device 420. The event detection model is applied by at least one processor (such as the at least one processor 312 in FIG. 3), and can comprise any appropriate model.

In an exemplary implementation, the "event" is a collision event where the vehicle is involved in a collision (with another vehicle or something in the environment). In this implementation the telematic data includes at least inertial data for the vehicle. Applying the event detection model at 412 comprises applying a collision detection model to detect such a collision. While the telematic data can include additional types of data beyond inertial data as discussed earlier, depending on the collision detection model used in some cases only inertial data is required. In some implementations, the collision detection model is a rules-based model, where if the inertial data indicates acceleration of the vehicle satisfies certain criteria, a collision is detected. For example, the collision detection model can comprise an inertial threshold model, where a collision is detected if acceleration of the vehicle exceeds at least one acceleration threshold. In some implementations, the collision detection model is a machine learning model, trained to detect vehicle collisions using labelled training data for collision scenarios.

In some implementations, the collision detection model can intake more data than just inertial data. For example, the telematics data can include speed data for the vehicle. The collision detection model can identify a collision not only when a magnitude of acceleration of the vehicle is high, but when magnitude of acceleration of the vehicle is inordinately high in consideration of a speed at which the vehicle was travelling prior to the acceleration. As another example, the telematics data can also include weight data for the vehicle (or a weight of the vehicle can be stored at management server 410, since weight typically does not fluctuate significantly while driving). The collision detection model can identify a collision not only when a magnitude of acceleration of the vehicle is high, but when magnitude of acceleration of the vehicle is inordinately high in consideration of the weight of the vehicle (e.g., a heavier vehicle can be associated with a lower inertia threshold, since such a vehicle will have greater momentum than other vehicles during a collision and thus may "push" other vehicles instead of being stopped).

In another exemplary implementation, the "event" is harsh motion event where the vehicle undergoes excessive motion change. Harsh motion events can include, for example, at least one of a harsh turn event (the vehicle turns sharply), a harsh brake event (the vehicle brakes are applied sharply), or a harsh acceleration event (the vehicle accelerator is applied sharply). In this example the telematic data includes at least inertial data for the vehicle. Applying the event detection model at 412 comprises applying a harsh motion detection model to detect such a harsh motion event. While the telematic data can include additional types of data beyond inertial data as discussed earlier, depending on the harsh motion detection model used in some cases only inertial data is required. In some implementations, the harsh motion detection model is a rules-based model, where if the inertial data indicates motion of the vehicle satisfies certain criteria, a harsh motion event is detected. For example, the harsh motion detection model can comprise a motion threshold model, where a harsh motion event is detected if change in motion of the vehicle exceeds at least one threshold. In some implementations, the harsh motion detection model is a machine learning model, trained to detect harsh changes in inertia using labelled training data for practical scenarios.

In some implementations, the harsh motion event detection model can discriminate between different types of harsh events, and apply appropriate thresholds. For example, harsh reduction in motion (slow-down) in a travel direction of the vehicle indicates harsh braking; harsh increase in motion (speed-up) in a travel direction of the vehicle indicates harsh acceleration; and harsh change in motion in a lateral direction of the vehicle (perpendicular to a travel direction of the vehicle) indicates harsh turning.

A harsh motion event detection model can be similar to a collision detection model (and a collision detection model can be considered as a particular type of harsh motion event detection model).

In some implementations, the harsh motion event detection model can intake more data than just inertial data. For example, the telematic data can include speed data for the vehicle. The harsh motion event detection model can identify a harsh motion event not only when change in motion of the vehicle is high, but when change in motion of the vehicle is inordinately high in consideration of a speed at which the vehicle was travelling prior to the motion change.

In another exemplary implementation, the "event" is speeding event where the vehicle is travelling excessively or unacceptably fast (e.g. vehicle speed is above a road speed limit). In this example the telematic data includes at least speed data for the vehicle (or speed data derived from other data, such as change in location data). Applying the event detection model at 412 comprises applying a speeding detection model to the speed data to detect such a speeding event. For example, the speeding detection model can comprise a speed threshold model, where a speeding event is detected if speed of the vehicle exceeds a speed threshold.

In another exemplary implementation, the "event" is a tailgating event where the vehicle is following another vehicle too closely (i.e. a distance between the vehicle and the other vehicle is too small). In this implementation, the third at least one processor of the image capture device collects following distance data indicating following distance between the vehicle and another vehicle in front of the vehicle. In particular, the third at least one processor applies a following distance detection model to the image data captured at 431. The following distance model can be an artificial intelligence or machine-learning based model, which analyzes the image to determine following distance. Exemplary following distance detection models are described in detail in U.S. patent Ser. No. 11/748,664 and U.S. Provisional Patent Application No. 63/606,307, the entirety of which are incorporated by reference herein.

The following distance data (or at least a portion thereof) is transmitted to the telematics device 420 by the fourth communication module (e.g. fourth communication module 336 in FIG. 3), and is received at the telematics device 420 by the second communication module (e.g. communication module 326 in FIG. 3). Transmission of the telematic data by the third communication module at 421 includes transmitting the at least a portion of following distance data with the telematic data, in this implementation. Receiving the telematic data by the first communication interface at 411 includes receiving the at least a portion of the following distance data by the first communication module (e.g. communication module 316).

In this implementation, applying the event detection model at 412 comprises applying a tailgating detection model to the at least a portion of the following distance data, to detect a tailgating event. In some implementations, the tailgating detection model is a rules-based model, where a tailgating event is detected when certain criteria are met. As one example, if following distance is below a distance threshold, a tailgating event is detected. As another example, the criteria may be that if following distance is below a distance threshold, for an amount of time which exceeds a time threshold, a tailgating event is detected. In some implementations, additional telematic data can be used by the tailgating detection model. As an example, the following distance threshold may be a function of vehicle speed. In particular, the distance threshold may be lower when the vehicle is travelling at a lower speed (because a vehicle which is travelling more slowly can stop faster such that less following distance is required). In some implementations, the tailgating detection model is a machine learning model, trained to detect tailgating using labelled training data for practical scenarios. Exemplary tailgating models are discussed in detail in U.S. patent Ser. No. 11/748,664 and U.S. Provisional Patent Application No. 63/606,307, the entirety of which are incorporated by reference herein.

In another exemplary implementation, the "event" is an emergency event, where vehicle operator input is received indicating that there is an emergency. For this implementation, the image capture device includes a user interface, such as user interface 331 in FIG. 3. The user interface can be an emergency user interface, which is designed to be quickly and easily activatable in the event of an emergency. For example, the user interface can comprise a "panic button", or an exposed touch area (e.g. capacitive area) within reach of the vehicle operator. Receiving such user input is shown in FIG. 4 at 439.

In response to activation of the emergency user interface, an emergency indication is transmitted to the telematics device 420 by the fourth communication module (e.g. fourth communication module 336 in FIG. 3), and is received at the telematics device 420 by the second communication module (e.g. communication module 326 in FIG. 3). Transmission of the telematic data by the third communication module at 421 includes transmitting the emergency indication in this implementation. Receiving the telematic data by the first communication interface at 411 includes receiving the emergency indication by the first communication module.

In this implementation, applying the event detection model at 412 comprises detecting the emergency event based on the emergency indication. That is, in this implementation the event detection model identifies an emergency situation when the emergency indication is received.

In some implementations, as appropriate for certain types of events, the event detection model may require that an event be detected over a sufficiently long period of time before the event is detected. For example, in detection of a speeding event, a speed detection model may require that the vehicle exceeds a speed threshold by a certain amount of time (e.g. 30 seconds) in order to detect speeding. Such implementations advantageously reduce false positive detections (e.g. a sudden erroneously high speed reading), momentary but acceptable driver behaviors, and momentary circumstances which take time for the driver to adjust to (e.g. another vehicle changes lane in front of the vehicle, requiring time for the driver to increase following distance).

At 413, if an event is not detected, method 400 proceeds to 414, where method 400 ends (or an iteration of method 400 ends). In this regard, method 400 can be performed iteratively. That is, image data can be captured and stored in accordance with acts 431 and 432 on a continuous, regular, or periodic basis. Likewise, telematic data can be received and transmitted in accordance with acts 421 and 422 on a continuous, regular, or periodic basis. Application of the event detection model at 412 can also be performed on a continuous, regular, or periodic basis, so as to identify an event when it occurs, even though a majority of the time an event will not usually occur.

If at 413 an event is detected, method 400 proceeds to 415 (and optionally 418).

Optionally, at 418, the management server 410 transmits a wake command. This wake command is intended for reception at telematics device 420, and is transmitted by a communication module which can communicate with the telematics device 420 (such as the first communication module 316 in FIG. 3). At 427, the wake command is received by the telematics device 420, by a communication module which can communicate with the management server 410 (such as third communication module 328 in FIG. 3), and the telematics device 420 wakes in response to the wake command. Scenarios where acts 418 and 427 are included in method 400 are discussed in detail later.

At 415, the management device 410 transmits a request for image data corresponding to a time period of the event, for reception at the telematics device 420. In this context, a "time period of the event" generally refers to a time period reasonably relevant to the event. For example, a "time period of the event" can refer to a time period which extends one minute prior to the detection of the event (or a timestamp of data based on which the event is detected) to one minute after first detection of the event. These boundaries for the time period are merely exemplary, and any boundaries can be set for the time period of the event as appropriate in a given application. Prior to transmission at 415, the request for image data can be prepared by at least one processor of management device 410 (e.g. the at least one processor 312 in FIG. 3), which can specify timestamps which delineate the "time period of the event".

At 423, the request for image data is received by the telematics device 420, by a communication module which can communicate with the management server 410 (such as third communication module 328 in FIG. 3).

Optionally, at 428, the telematics device 420 transmits a wake command. This wake command is intended for reception at image capture device 430, and is transmitted by a communication module which can communicate with the image capture device 430 (such as the second communication module 326 in FIG. 3). At 438, the wake command is received by the image capture device 430, by a communication module which can communicate with the telematics device 420 (such as fourth communication module 336 in FIG. 3), and the image capture device 430 wakes in response to the wake command. Scenarios where acts 428 and 438 are included in method 400 are discussed in detail later.

At 424, the telematics device 420 transmits the request for image data. This transmission is intended for reception at image capture device 430, and is transmitted by a communication module which can communicate with the image capture device 430 (such as the second communication module 326 in FIG. 3). In some implementations, the telematics device 420 can forward the request for image data as received from the management server 410 at 423. In other implementations, the telematics device 420 (e.g. by the at least one processor 322 in FIG. 3) can process the request for image data received from the management server 410 at 423, and prepare another request for image data (for example, the telematics device 420 may reformat a message requesting image data, for optimal transmission to the image capture device over a corresponding communication module).

At 433, the request for image data, from the telematics device 420, is received by the image capture device 430, by a communication module which can communicate with the telematics device 420 (such as fourth communication module 336 in FIG. 3). In this way, the image capture device 430 is informed that image data for a time period corresponding to the event is requested.

In some scenarios, a major collision may impair functionality of the vehicle or devices therein. For example, if an electrical system of a vehicle (or other electrical connections) is damaged such that the telematics device 420 or the image capture device 430 cannot draw power therefrom, this could prevent retrieval of image data from the image capture device. To address this, in some implementations the telematics device 420 and/or the image capture device 430 can be connected to (or include) a battery, to provide power in the event of an emergency. An exemplary battery device is discussed for example in U.S. patent Ser. No. 11/522,235, the entirety of which is incorporated by reference herein.

In response to receiving the request for image data, the image capture device 430 accesses the requested image data at 434. In particular, from the image data stored in the at least one non-transitory processor-readable storage medium in act 432, image data corresponding to the time period of the event, as indicated in the request for image data, is accessed. At 435, the accessed image data is transmitted by the image capture device 430. This transmission is performed by a communication module capable of communication with management server 410 (such as communication module 338 in FIG. 3). In some implementations, the accessed image data is transmitted for reception at the management server 410 (as shown by optional acts 416 and 417 in FIG. 4). In other implementations, the accessed image data is transmitted to a remote datastore 440 separate from the management server 410 (as shown by optional acts 441 and 442 in FIG. 4).

At 416, the image data for the event transmitted at 435 is received by the management server 410, by a communication module which can communicate with the image capture device (such as first communication module 316 in FIG. 3).

At 417, the received image data for the event is output. For example, the received image data could be output by a display of the management server 410 or a client device connected thereto, for review by an operator, employer, fleet manager, driver coach, law enforcement, forensics, insurance agents, or any other appropriate parties. As another example, outputting the image data at 417 can comprise storing the image data, such as in at least one non-transitory processor-readable storage medium of the management server 410. Optionally, the management server 410 can further transmit the image data to another device (such as remote datastore 440) for storage separate from the image capture device 430, telematics device 420, and management server 410. Storing the image data is useful for securing the image data long term in the event it is needed for later review or evidence.

Alternatively, at 441, the image data for the event transmitted at 435 is received by remote datastore 440, by a communication module which can communicate with the image capture device 430. At 442, the received image data for the event is stored, such as in at least one non-transitory processor-readable storage medium of the remote datastore 440. Storing the image data is useful for securing the image data long term in the event it is needed for later review or evidence. The stored image data could later be accessed by a client device connected thereto, for review by an operator, employer, fleet manager, driver coach, law enforcement, forensics, insurance agents, or any other appropriate parties.

Notably, in method 400 the communication module by which the image capture device 430 receives the request for image data is different from the communication module by which the image capture device 430 sends the image data for the event. That is, the image capture device 430 receives the request for image data from the management server 410 indirectly, via the telematics device 420. In contrast, the image capture device 430 transmits the image data for the event more directly (i.e., not via the telematics device 420). Such an implementation has a number of advantages discussed below.

The telematics device communication module which communicates with the management server (e.g. third communication module 328 in FIG. 3) is already present in telematics-enabled vehicles, and generally at least periodically active, to transmit telematic data to the management server. In contrast, the image capture device communication module which communicates with the management server can generally be in an inactive or deactivated mode (e.g. in a shut down or low-power consumption stand by state where communication with the management server is not enabled), and only transitioned to an active state occasionally when needed (e.g. to transmit requested image data). As such, transmitting the image data as in act 435 of method 400 can comprise operating the communication module which connects to the management server (e.g. communication module 338 in FIG. 3) in an active mode where communication with the management server is enabled. Such operation can be achieved by transitioning operational mode of the communication module, such as by for example an internal message within the image capture device. After the image data is transmitted, the communication module can be transitioned back to operating in the inactive mode where communication with the management server is not enabled.

Such an implementation can reduce subscription costs, by only requiring regular activation of one long-range communication module of the telematics device (the third communication module 328 in FIG. 3), while keeping another long-range communication module (the fifth communication module 338 in FIG. 3) in a deactivated or low-power mode until needed on occasion. In such an implementation, a cellular service subscription can be maintained for the long-range communication module of the telematics device, while a different payment model (e.g. a pay-per-use) model could be used for the long-range communication module of the image capture device.

Optional acts 418, 427, 428, and 438 can advantageously enable access and transmission of image data at 434 and 435 (as discussed earlier), even if the telematics device 420 and/or the image capture device 430 are in a non-active or sleep mode after capturing and storing image data in accordance with acts 431 and 432, or receiving and transmitting telematics data in accordance with acts 421 and 422, as discussed earlier. In particular, in many implementations, telematics device 420 and/or image capture device 430 are configured to operate in a sleep or low-power mode when a vehicle to which they are installed is not activated. Such operation prevents or reduces drain on a vehicle battery.

In a first exemplary implementation, activation of the vehicle where telematics device 420 and image capture device 430 are installed triggers waking of the telematics device 420 and/or image capture device 430. For example, telematics device 420 connects to a vehicle data port (such as the OBDII port, via data port 321 discussed with reference to FIG. 3). Telematics device 420 receives an indication of activation of the vehicle via the data port. In response to activation of the vehicle, the telematics device sends a wakeup command to the peripheral device 430, which causes the peripheral device to wake.

The telematics device can receive any appropriate form of activation signal from the vehicle. For example, the telematics device 420 can receive an explicit ignition signal which indicates that the ignition of the vehicle has been activated. As another example, the telematics device 420 can identify activation of the vehicle based on other signals, such as a battery voltage signal from which the telematics device 420 identifies a cranking event of an ignition of the vehicle. As yet another example, the telematics device 420 can receive a signal which explicitly indicates a state of the vehicle, such as Accessory mode or Drive mode, which indicates activation of the vehicle. As yet another vehicle, the telematics device may be selectively provided power by the vehicle only when the vehicle is activated (e.g. power is not provided to the telematics device 420 when the vehicle is not activated).

In response to deactivation of the vehicle (e.g. the signal from the vehicle indicates that the vehicle is no longer active), the telematics device 420 and/or the image capture device 430 can deactivate or enter a sleep or low-power mode.

In a second exemplary implementation, waking of the telematics device 420 and/or the image capture device 430 can be performed even when the vehicle is off (e.g. an ignition of the vehicle is not activated). For example, telematics device 420 can wake according to a schedule, to transmit a status update or "heartbeat" of telematics data to management server 410. Such a schedule could for example be every 30 minutes for the first 24 hours after the vehicle is deactivated, and every 24 hours after the first 24 hours (to conserve vehicle battery). This is one non-limiting example of a wakeup schedule, and any appropriate wakeup schedule could be implemented instead.

In implementations where a wakeup schedule is used for telematics device 420, image capture device 430 could be woken according to the same schedule (e.g. to collect "heartbeat" image data). This is not necessarily the case, however. In some implementations, image capture device 430 may remain in a sleep, low-power, or deactivated mode even when telematics device 420 is woken up on schedule.

Returning to method 400 in FIG. 4, detection of the event at 413 is commonly not instantaneous (e.g. transmitting the telematic data at 422 and 411, applying the event detection model at 412, and determining whether an event is detected at 413 can in some cases take 10 minutes or more). In some scenarios, a vehicle may be deactivated, and consequently telematics device 420 and/or image capture device 430 may enter a sleep or non-active mode during this time. Acts 418, 427, 428, and 438 are useful in such scenarios. Non-limiting examples are discussed below.

In a first example, the event detection model applied at 412 is a collision detection model, and the event detected at 413 is a collision. In many vehicles, the vehicle is deactivated in response to detection of a collision by sensors internal to the vehicle (e.g. ignition of the vehicle is disabled). This is a safety feature to prevent further damage or harm (e.g. to prevent fire caused by an engine of the vehicle). As a result, for such vehicles, the collision event detected at 412 and 413 results in the vehicle being deactivated at the time of the collision event (which typically precedes detection of the event).

In a second example, the event detection model applied at 412 is a harsh motion event detection model, and the event detected at 413 is a harsh motion event (as discussed earlier). Following a harsh motion event, the vehicle may be deactivated by the driver. For example, the driver may drive harshly to a parking location, and shut off the vehicle once parked. As a result, the harsh motion event detected at 412 and 413 may only be detected after the vehicle (and the telematics device 420 and/or the image capture device 430) are deactivated.

In each of the above examples, when the vehicle is deactivated, telematics device 420 and/or image capture device 430 can also be deactivated or otherwise put into a sleep or non-active mode, as a result of the above implementations where activation of telematics device 420 and/or image capture device 430 is linked to activation of the vehicle. Acts 418, 427, 428, and 438 provide means to wake up the telematics device 420 and/or the image capture device 430.

Transmitting the wake command at 418 and waking the telematics device 420 at 427 enables the telematics device to transmit the request for image data to the image capture device 430 at 424.

In some implementations, the wake command transmitted at 418 and the request for image data transmitted at 415 are different transmissions. In particular, the wake command is first transmitted at 418, to cause waking of the telematics device 420 at 427. Once the telematics device 420 is awake and ready to receive the request for image data, the management server 410 transmits the request for image data at 415. Such an implementation advantageously allows for the use of a multi-purpose wake command which is not explicitly tied to a request for image data. As a result, the wake command can be used to wake the telematics device 420 for any other reasons in addition to or separate from requesting image data. This improves function and message modularity in the context of the system.

In some implementations, the wake command transmitted at 418 and the request for image data transmitted at 415 are a unified transmission. In particular, a single message can be transmitted from the management server 410 to the telematics device 420, to cause waking of the telematics device 420 at 427 and to request image data. Such an implementation advantageously reduces quantity of message transmissions, which can improve responsiveness and speed.

Similarly, transmitting the wake command at 428 and waking the image capture device 430, even if the vehicle is not activated, enables access and transmission of the image data at 434 and 435.

In some implementations, the wake command transmitted at 428 and the request for image data transmitted at 424 are different transmissions. In particular, the wake command is first transmitted at 428, to cause waking of the image capture device 430 at 438. Once the image capture device 430 is awake and ready to receive the request for image data, the telematics device 420 transmits the request for image data at 424. Such an implementation advantageously allows for the use of a multi-purpose wake command which is not explicitly tied to a request for image data. As a result, the wake command can be used to wake the image capture device 430 for any other reasons in addition to or separate from requesting image data. This improves function and message modularity in the context of the system.

In some implementations, the wake command transmitted at 428 and the request for image data transmitted at 424 are a unified transmission. In particular, a single message can be transmitted from the telematics device 420 to the image capture device 430, to cause waking of the image capture device 430 at 438 and to request image data. Such an implementation advantageously reduces quantity of message transmissions. As a result, subsequent image transmission initiation can be faster, and less bandwidth is used when initiating the image transmission.

As mentioned earlier, acts 418, 427, 428, and 438 are optional.

As one example, the event detection model applied at 412 may only be pertinent to when the telematics device 420 and/or the image capture device 430 are already active, such that events are generally not detected when the vehicle is deactivated.

As another example, in some implementations, the management server 410 can attempt to transmit the request for image data 415 to telematics device 420, and may only send the wake command at 418 if the request for image data is not received. Similarly, the telematics device 420 can attempt to transmit the request for image data at 424, and may only send the wake command at 428 if the request for image data is not received.

As yet another example, the telematics device 420 and/or the image capture device 430 may be configured to remain in an active or awake mode for a period of time after deactivation of the vehicle. For example, the telematics device 420 and/or the image capture device 430 may be configured to enter a sleep or non-active mode 15 minutes after deactivation of a vehicle in which they are installed. This time period is merely exemplary, and any time period could be set as appropriate for a given application. In this way, even if detection of an event at 412 and 413 is delayed, there is still substantial time for the telematics device 420 or the image capture device 430 to receive a request for image data after the vehicle is deactivated.

The activation, deactivation, and wake behavior of the telematics device 420 is not necessarily limiting on the image capture device 430, and vice versa. That is, the telematics device 420 and the image capture device 430 are not necessarily governed by the same activation, deactivation, and wake behavior (although they can be, if appropriate). In one non-limiting exemplary implementation, telematics device 420 is configured to remain in an awake or active mode for a set period of time (e.g. 15 minutes) after deactivation of the vehicle, whereas image capture device 430 is configured to enter a sleep or non-active mode upon deactivation of the vehicle. In such an implementation, acts 418 and 427 generally do not need to be included in method 400, but acts 428 and 438 will be. In particular, telematics device 420 should be active long enough after deactivation of the vehicle such that, if an event is detected at 412 and 413, the request for image data at 415 should be received by the telematics device 420 at 423, without the need for a wake command to the telematics device 420. The image capture device 430, however, is in a sleep or non-active mode, and thus acts 428 and 438 are included in method 400, such that the telematics device 420 wakes the image capture device 430 for access and transmission of image data at 435.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device (e.g. vehicle device 122 or network device 110) generally refers to the data information being stored at a non-transitory processor-readable storage medium of said device (e.g. non-transitory processor-readable storage mediums 116 or 126).

24

What is claimed is:

1. A system comprising:

a management server having a first at least one communication module, a first at least one processor, and a first at least one non-transitory processor readable storage medium storing first processor-executable instructions thereon;

a telematics device positioned at a vehicle, a second communication module, a third communication module, a second at least one processor, and a second at least one non-transitory processor readable storage medium storing second processor-executable instructions thereon; and an image capture device positioned at the vehicle, the image capture device having at least one image sensor, a fourth communication module, a fifth communication module, a third at least one processor, and a third at least one non-transitory processor-readable storage medium storing third processor-executable instructions thereon, wherein:

the third processor-executable instructions cause the image capture device to:

capture, by the at least one image sensor, image data; and store, by the third at least one non-transitory processor-readable storage medium, the image data;

the second processor-executable instructions cause the telematics device to:

receive telematic data for the vehicle; and transmit, by the third communication module for reception at the management server, the telematic data;

the first processor-executable instructions cause the management server to:

receive, by the first at least one communication module, the telematic data;

apply, by the first at least one processor, an event detection model to the telematic data to detect an event at the vehicle; and in response to detecting the event at the vehicle, transmit, by the first at least one communication module for reception at the telematics device, a request for image data corresponding to a time period of the event;

the second processor-executable instructions further cause the telematics device to:

receive, by the third communication module, the request for image data; and transmit, by the second communication module, the request for image data for reception at the image capture device; and the third processor-executable instructions further cause the image capture device to:

receive, by the fourth communication module, the request for image data;

access, at the third at least one non-transitory processor-readable storage medium, image data corresponding to the time period; and transmit, by the fifth communication module for reception remote from the vehicle, the image data corresponding to the time period, comprising operating the fifth communication module in an active mode where communication with the management server is enabled, bypassing the telematics device; and after transmitting the image data corresponding to the time period, operate the fifth communication module in an inactive mode where communication with the management server is not enabled and power consumption is lower than in the active mode.

2. The system of claim 1, wherein the fourth communication module and the second communication module comprise respective wired communication modules, for wired communication between the telematics device and the image capture device.

3. The system of claim 1, wherein the fourth communication module and the second communication module comprise respective short-range wireless communication interfaces.

4. The system of claim 1, wherein:

the fifth communication module comprises a first cellular modem at the image capture device which communicates over a first cellular network;

the third communication module comprises a second cellular modem at the telematics device which communicates over the first cellular network or a second cellular network different from the first cellular network; and the first at least one communication module comprises a network module which communicatively couples to a cloud network or the internet.

5. The system of claim 1, wherein:

the telematic data includes at least inertial data for the vehicle;

the event is a collision; and the first processor-executable instructions which cause the first at least one processor to apply the event detection model to the telematic data cause the first at least one processor to: apply a collision detection model to at least the inertial data to detect the collision.

6. The system of claim 5, wherein:

the telematic data further includes speed data for the vehicle; and the first processor-executable instructions which cause the first at least one processor to apply a collision detection model to at least the inertial data to detect the collision cause the first at least one processor to: apply the collision detection model to the inertial data and the speed data to detect the collision.

7. The system of claim 1, wherein:

the telematic data includes at least inertial data for the vehicle;

the event is a harsh motion event comprising at least one of a harsh turn event, a harsh brake event, or a harsh acceleration event; and the first processor-executable instructions which cause the first at least one processor to apply the event detection model to the telematic data cause the first at least one processor to: apply a harsh motion detection model to at least the inertial data to detect the harsh motion event.

8. The system of claim 7, wherein:

the telematic data further includes speed data for the vehicle; and the first processor-executable instructions which cause the first at least one processor to apply a harsh motion detection model to at least the inertial data to detect the harsh motion event cause the first at least one processor to: apply the harsh motion detection model to the inertial data and the speed data to detect the harsh motion event.

9. The system of claim 1, wherein:

the image capture device further comprises an emergency user interface;

in response to activation of the emergency user interface by a driver of the vehicle, the third processor executable instructions cause the image capture device to transmit an emergency indication to the telematics device by the fourth communication module;

the second processor-executable instructions further cause the telematics device to receive the emergency indication by the second communication module;

the second processor-executable instructions which cause the telematics device to transmit the telematic data by the third communication module further cause the telematics device to transmit the emergency indication with the telematic data; and the first processor-executable instructions which cause the first at least one processor to apply the event detection model to the telematic data cause the first at least one processor to: detect the event based on the emergency indication.

10. The system of claim 1, wherein:

the telematic data includes speed data for the vehicle;

the event is speeding event where a speed of the vehicle exceeds a speed threshold; and the first processor-executable instructions which cause the first at least one processor to apply the event detection model to the telematic data cause the first at least one processor to: apply a speeding detection model to the speed data to detect the speeding event.

11. The system of claim 1, wherein:

the third processor-executable instructions further cause the third at least one processor to collect following distance data between the vehicle and another vehicle in front of the vehicle, by applying a following distance detection model to the captured image data;

the third processor executable instructions further cause the image capture device to transmit at least a portion of the following distance data to the telematics device by the fourth communication module;

the second processor-executable instructions further cause the telematics device to receive the at least a portion of the following distance data;

the second processor-executable instructions which cause the telematics device to transmit the telematic data by the third communication module further cause the telematics device to transmit the at least a portion of the following distance data with the telematic data;

the event comprises a tailgating event where a following distance between the vehicle and the other vehicle is below a threshold; and the first processor-executable instruction which cause the first at least one processor to apply the event detection model to the telematic data cause the first at least one processor to: apply a tailgating detection model to the at least a portion of the following distance data.

12. The system of claim 1, wherein the telematics device further comprises at least one of:

an inertial sensor;

a location sensor; or a speed sensor.

13. The system of claim 1, wherein the first processor-executable instructions further cause the management server to:

receive, by the first at least one communication module, the image data corresponding to the time period from the image capture device.

14. The system of claim 1, further comprising a remote datastore separate from the vehicle and separate from the management server, wherein the remote datastore receives the image data corresponding to the time period from the image capture device, bypassing the management server.

15. The system of claim 1, wherein:

the first processor-executable instructions further cause the management server to transmit, by the first communication module, a wake command for reception at the telematics device; and the second processor-executable instructions further cause the telematics device to wake in response to the wake command, prior to transmitting the request for image data by the second communication module for reception at the image capture device.

16. The system of claim 15, wherein the first processor-executable instructions which cause the first communication module to transmit the wake command cause the first communication module to transmit the wake command prior to transmitting the request for image data for reception at the telematics device.

17. The system of claim 1, wherein:

the second processor-executable instructions further cause the telematics device to transmit, by the second communication module, a wake command for reception at the image capture device; and the third processor-executable instructions further cause the image capture device to wake in response to the wake command, prior to accessing the image data corresponding to the time period.

18. The system of claim 17, wherein the second processor-executable instructions which cause the second communication module to transmit the wake command cause the second communication module to transmit the wake command prior to transmitting the request for image data.

\* \* \* \* \*